United States Patent [19]
Bales et al.

[11] Patent Number: 5,369,694
[45] Date of Patent: Nov. 29, 1994

[54] UNATTENDED MEET-ME-CONFERENCE CONTROLLED BY A TELEPHONE TERMINAL

[75] Inventors: Bruce M. Bales, Louisville; Ted M. Fidder, Broomfield; Donald D. Gallagher; Stephen M. Thieler, both of Boulder, all of Colo.

[73] Assignee: AT&T Corp., Murray Hill, N.J.

[21] Appl. No.: 996,349

[22] Filed: Dec. 23, 1992

[51] Int. Cl.⁵ .................... H04M 3/56; H04M 11/06
[52] U.S. Cl. .................... 379/206; 379/202; 379/201; 379/93; 379/96; 370/62
[58] Field of Search ............... 379/202, 204, 205, 206, 379/207, 157, 158, 201; 370/62

[56] References Cited

U.S. PATENT DOCUMENTS

| | | | |
|---|---|---|---|
| 4,132,860 | 1/1979 | Rasmussen | 379/158 |
| 4,436,963 | 3/1984 | Cottrell et al. | 179/18 B |
| 4,546,468 | 10/1985 | Christmas et al. | 370/54 |
| 4,577,065 | 3/1986 | Frey et al. | 379/204 |
| 4,635,251 | 1/1987 | Stanley et al. | 379/204 |
| 4,653,090 | 3/1987 | Hayden | 379/204 |
| 4,796,293 | 1/1989 | Blinken et al. | 379/202 |
| 5,195,086 | 3/1993 | Baumgartner | 379/202 |

FOREIGN PATENT DOCUMENTS

| | | | |
|---|---|---|---|
| 3014439 | 4/1980 | Germany | H04M 3/42 |
| 61-0231056 | 9/1986 | Japan | H04M 3/42 |

OTHER PUBLICATIONS

E. D. Haszto et al., *Alliance ® Teleconferencing Services Boost Business Efficiency*, AT&T Technology, vol. 3, No. 1, 1988, pp. 22–31.

*Primary Examiner*—James L. Dwyer
*Assistant Examiner*—Daniel Hunter
*Attorney, Agent, or Firm*—John C. Moran

[57] ABSTRACT

Creating the capability of a meet-me-conference call on a telephone terminal by actuation of a meet-me-conference button on the telephone terminal. The meet-me-conference button is actuated for a particular line appearance, and the meet-me-conference is then established by other telephone terminals calling the telephone number associated with that line appearance. The user of the telephone terminal can join the conference at a later point in time by going off-hook (call originator). As other parties call that line appearance, the telephone terminal adds them to the conference. As parties join the conference, their names are displayed on the telephone terminal, and a second button on the telephone terminal can be utilized to drop parties as they are added to the conference. A second actuation of the meet-me-conference button prevents further callers to the line appearance from being added to the conference which is also referred to as deactivation of the meet-me-conference.

21 Claims, 10 Drawing Sheets

MESSAGE FLOW

MESSAGE FLOW

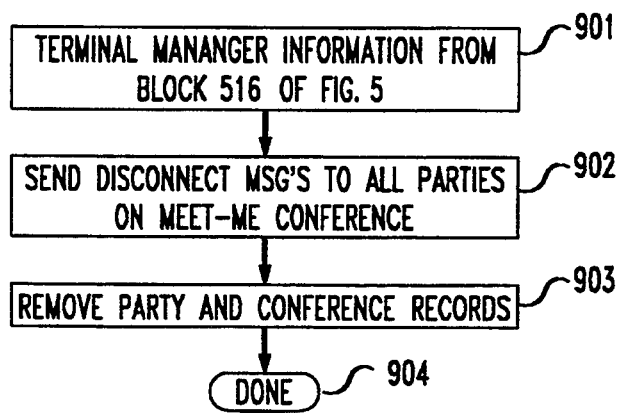
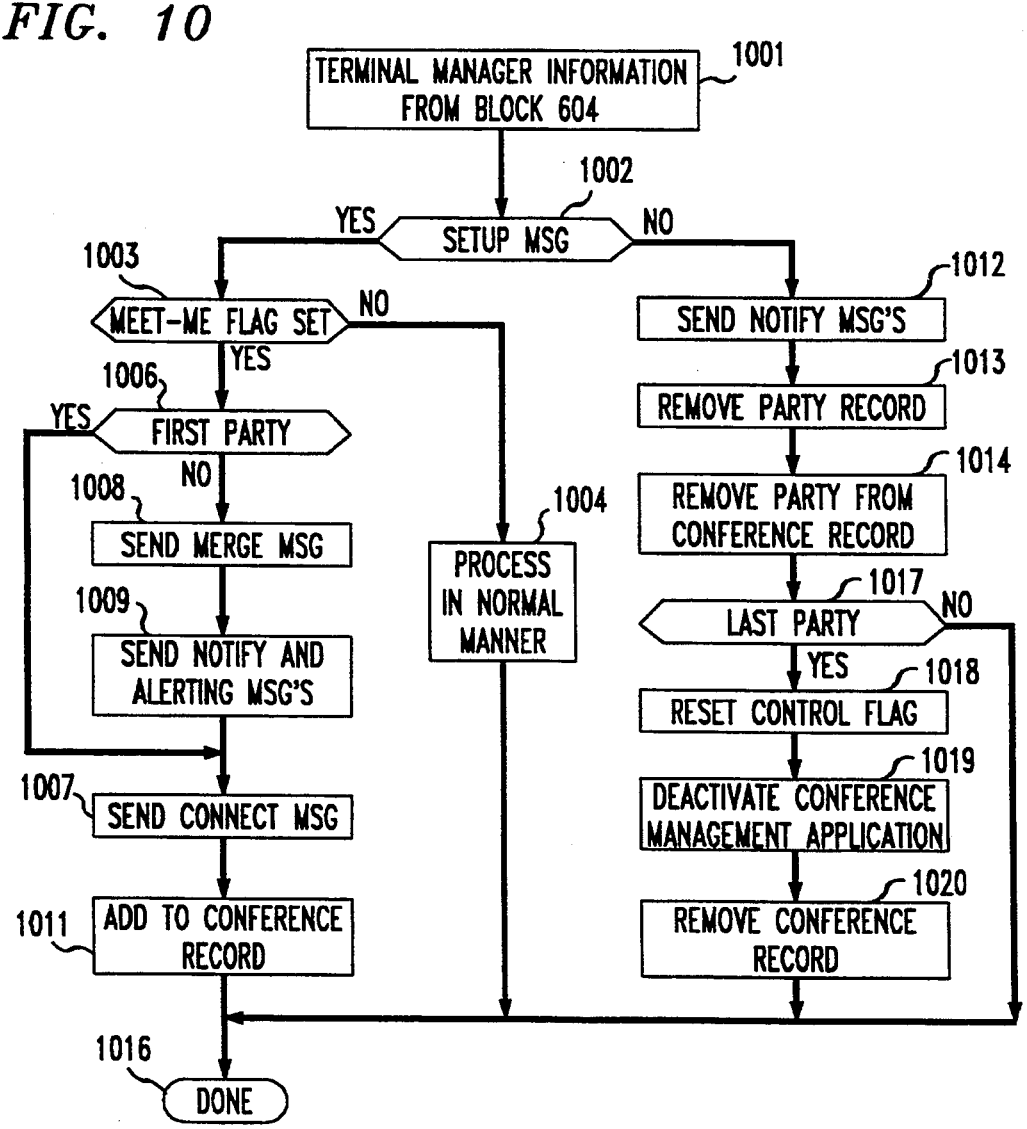

5,369,694

UNATTENDED MEET-ME-CONFERENCE CONTROLLED BY A TELEPHONE TERMINAL

TECHNICAL FIELD

This invention relates to telecommunication conference calls and, in particular, to the establishment of a telecommunication conference call.

BACKGROUND OF THE INVENTION

In prior art business communication switching systems (also referred to as PBXs), an unattended meet-me-conference call can be set up between a plurality of telephone station sets by each of the station sets calling a conferencing bridge within the PBX that had been previously reserved. To set up the conference, the user of each station set dials a unique telephone number of the conferencing bridge. The conferencing bridge is responsive to each incoming call to add that call to the conference.

Within the AT&T Long Distance Telephone Network, a teleconferencing service known as the Alliance Dedicated Teleconferencing Service is available. The Alliance service comprises a teleconferencing bridge connected to a 4ESS toll switch. The Alliance service allows unattended meet-me-conference calls to be established if a reservation has been obtained in advance for such a conference call.

The problem with the conferencing bridges is that reservations must be made well in advance of the conference through an administrator. In addition, there have been many occurrences where unattended parties have gained access to the conference via the conference bridge. This occurs when the telephone number of the bridge has leaked out to the general public and "hackers" have found ways to break in on the conference. Of these two problems, the problem of having to reserve the bridge in advance is the most bothersome. In addition, the cost of arranging reservations on a PBX is added to the overall cost of operating the PBX.

SUMMARY OF THE INVENTION

The foregoing problems are solved and a technical advance is achieved by a telephone terminal that is equipped with a meet-me-conference actuator which, when actuated for a particular line appearance, creates the capability of a meet-me-conference call on that line appearance using the telephone number associated with that line appearance. Advantageously, the actuator is a button on the telephone terminal. The user of the telephone terminal can join the conference at a later point in time. As other parties call that line appearance, the telephone terminal adds them to the conference. The telephone terminal maintains control of the conference and can drop any party at any time. In addition, as parties join the conference their names are displayed on the telephone terminal, and a second actuator on the telephone terminal can be utilized to drop parties as they are added to the conference. Advantageously, the second actuator is a button on the telephone terminal. The second actuation of the meet-me-conference button prevents further callers to the line appearance from being added to the conference.

A software application program running in the telephone terminal controls the meet-me-conference by receiving incoming calls and transmitting the necessary messages to cause a switching system to add those incoming calls to the meet-me-conference.

BRIEF DESCRIPTION OF THE DRAWING

FIGS. 7 through 11 illustrate, in flow chart form, the operations performed by a meet-me-conference manager application in providing a meet-me-conference call.

DETAILED DESCRIPTION

Figure 1:
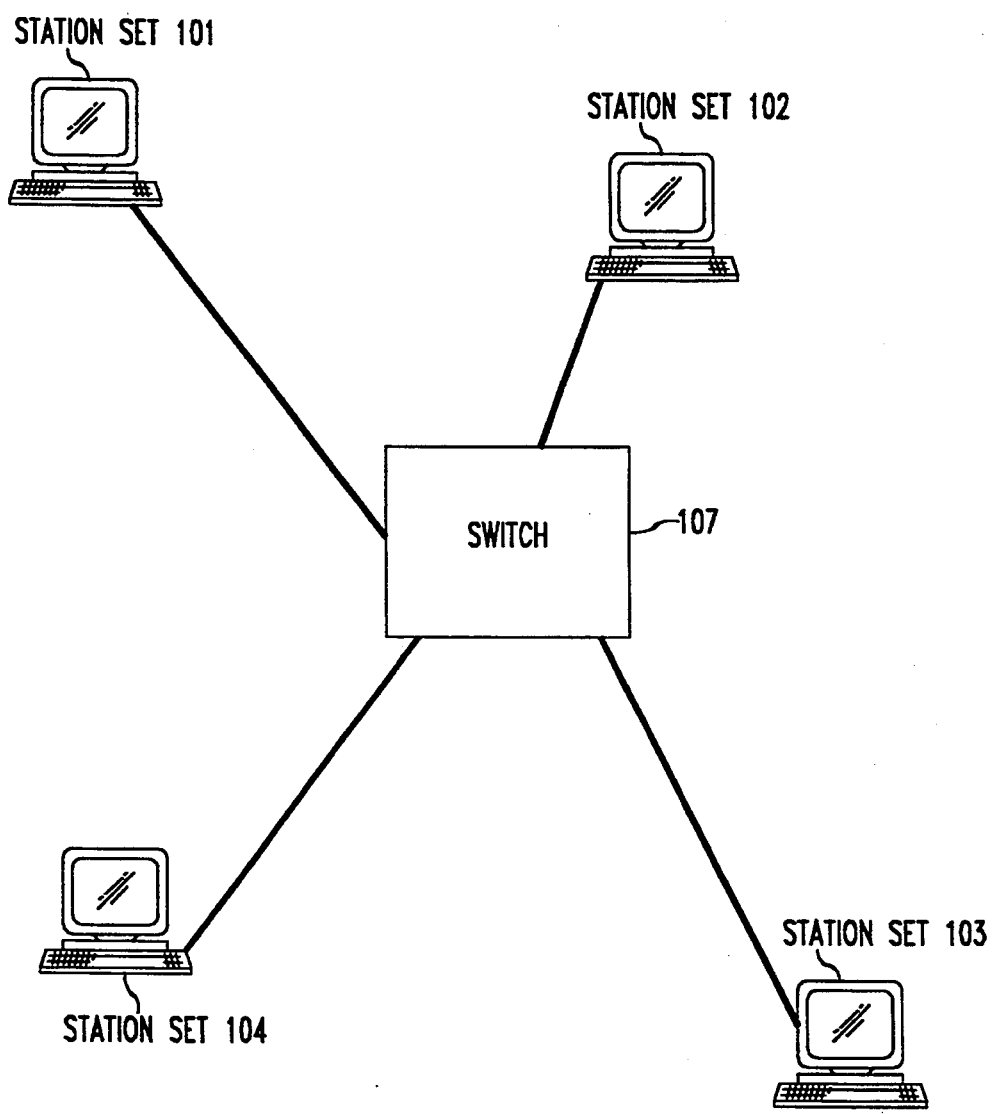
FIG. 1 shows a telecommunication switching system in accordance with the invention.

FIG. 1 illustrates a telecommunication switching system where station sets 101 through 104 are interconnected by switch 107. The basic operations of station sets 101 through 104 and switch 107 are described in further detail in the U.S. patent application of B. M. Bales, et al. entitled "Automatic Initialization of a Distributed Telecommunication System", Case 9-5-5-5, Ser. No. 07/816,360, filed on Dec. 30, 1991, and having the same assignee as the present patent application. This patent application of Bales is hereby incorporated by reference. Both the station sets and the switch implement a conventional OSI model modified to implement the ISDN protocol. As set forth in the above-incorporated patent application, certain modifications have been made to the standard OSI model in order to include ISDN capabilities. Within the software model, there are eight software layers, each of these software layers is described in detail in the above-incorporated patent application. (Note that the OSI model is also designated as having seven layers where the highest layer combines layers seven and eight of the description in the present application.) The present application is presented in terms of the highest software layer, the applications layer, and assumes the details set forth in the above-incorporated patent application. In addition, the functions performed by the remaining software layers, such as system initialization, call routing, and message transmission, are also set forth with respect to the above-incorporated patent application.

The present invention is described by way of an example where a meet-me-conference is initiated on station set 101 and where stations sets 102 and 103 join this meet-me-conference by placing calls to station set 101. After station sets 102 and 103 have joined the meet-meet-conference call, the user of station set 101 joins the conference by going off hook on the meet-me-conference line appearance which results in station set 101 being automatically added to the meet-me-conference. Finally, station set 104 dials the same line appearance number and is also joined briefly into the meet-me-conference. However, station set 104 is disconnected from the conference by the actuation of the disconnect button on station set 101. (Note station set 101 can join the meet-me-conference at any time.)

Figure 2:
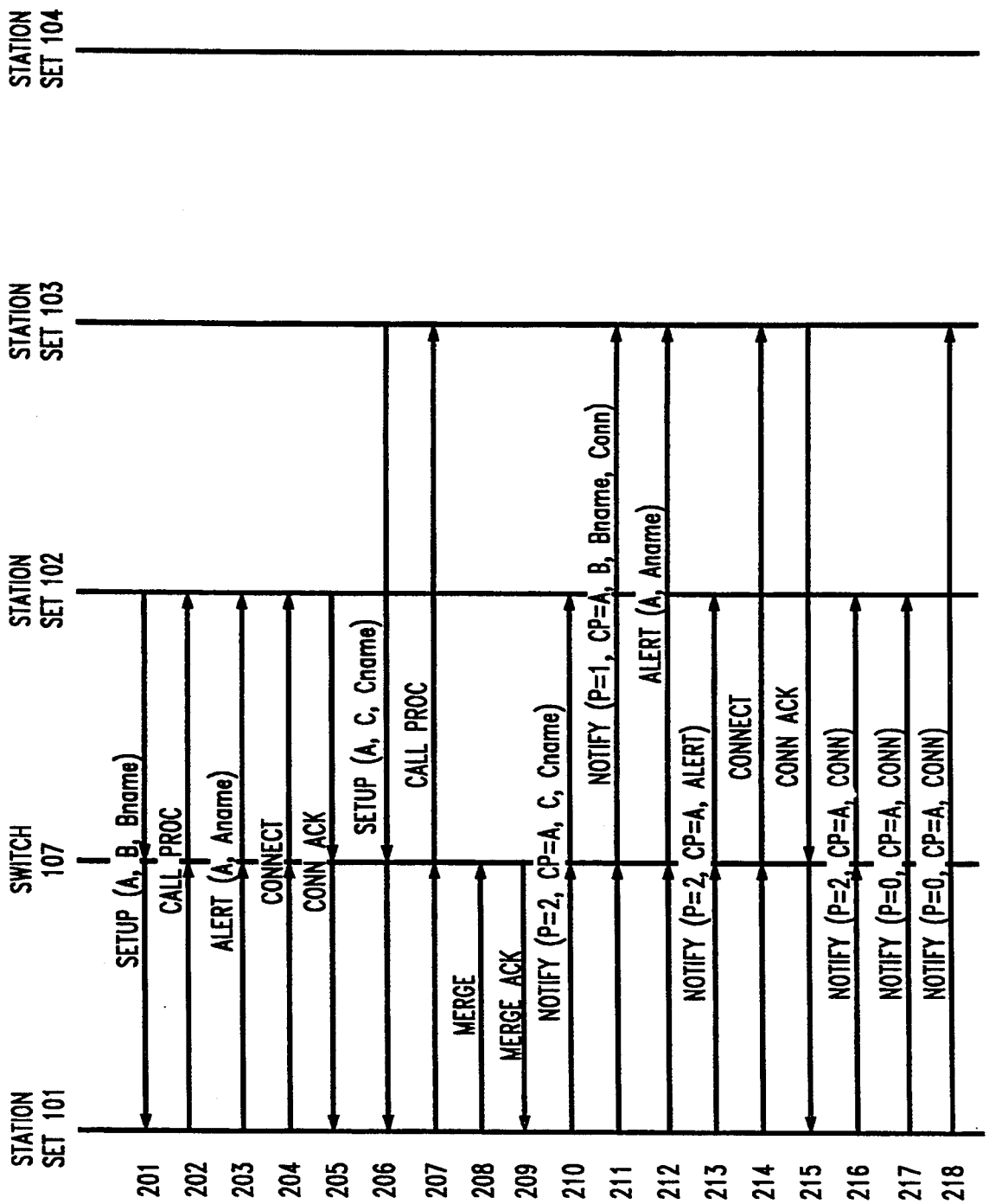
FIG. 2 illustrates the message flow for adding two station sets into a meet-me-conference call.

The meet-me-conference is set up by the message flow illustrated in FIG. 2. Within the message diagrams of FIGS. 2, and 4, the designations A, B, C, and D, refer to station sets 101, 102, 103, and 104, respectively. Station set 102 first sends a setup message, as illustrated in line 201, to station set 101. The setup message contains the destination which is station set 101, the originator which is station set 102, and includes the alphanumeric name of the user of station set 102. Station set 101 responds in line 202 by transmitting a call proceeding message back to station set 102. Station set 101 then transmits the alerting message back to station set 102 in line 203. The alerting message contains the telephone number (address) and the alphanumeric name of the user of station set 101. Station set 101 does not give an audible alerting tone at this time. Next, station set 101 transmits back on line 204 a connect message. In the present example, the user of station set 101 has not gone off hook yet. Switch 107 is responsive to the connect message to set up a voice path between station set 101 and station set 102. Station set 102 is responsive to the connect message from station set 101 to transmit back the connection acknowledgment message in line 205.

Station set 103 originates another call to station set 101 in lines 206 and 207. Station set 101 is responsive to the call from station set 103 to invoke a meet-me-conference call. By transmission of the merge message of line 208, station set 101 requests that switch 107 merge the first and the second calls together. The merge function is different than a conference function in that switch 107 only combines the B channels (voice portions) associated with the two calls for transmission to each of the three station sets and not the D channels (signaling portions). The signaling from station sets 102 and 103 is only transmitted to station set 101, which allows station set 101 to retain control of the meet-me-conference. In response to the merge message of line 208, switch 107 performs a merge function and transmits back the merge acknowledgment message of line 209. After receipt of the merge acknowledgment message, station set 101 transmits to station set 102 in line 210 a notify message which informs station set 102 that the second party (P=2, with 2 being the I.D. number) on the conference is station set 103 and that station set 101 is the controlling station set (CP=A). Similarly, station set 101 transmits to station set 103 a notify message in line 211 that informs station set 103 that the first party on the meet-me-conference is station set 102 and provides the name of the user of station set 102 to station set 103. In line 212, station set 101 transmits back an alerting message and provides its station set number as well as the name of the user of station set 101 to station set 103. In addition, station set 101 transmits a notify message to inform station set 102 of the second party's name and the fact that station set 101 is being alerted. Then, station set 103 transmits back the connect message in line 214 to station set 103. Station set 101 also transmits a notification message in line 216 to station set 102 informing it that the second party is now connected. Station set 103 is responsive to the connect message to transmit back the connect acknowledge message in line 215.

After station sets 102 and 103 have entered the meet-me-conference, the user of station set 101 goes off hook (also referred to as a call origination) on the line appearance and is automatically placed in the meet-me-conference. Note, that the messages of lines 204 and 208 had already added station set 101 to the meet-me-conference. The notify messages of lines 217 and 218 inform station sets 102 and 103 that station set 101 is now a party to the meet-me-conference.

Figure 3:
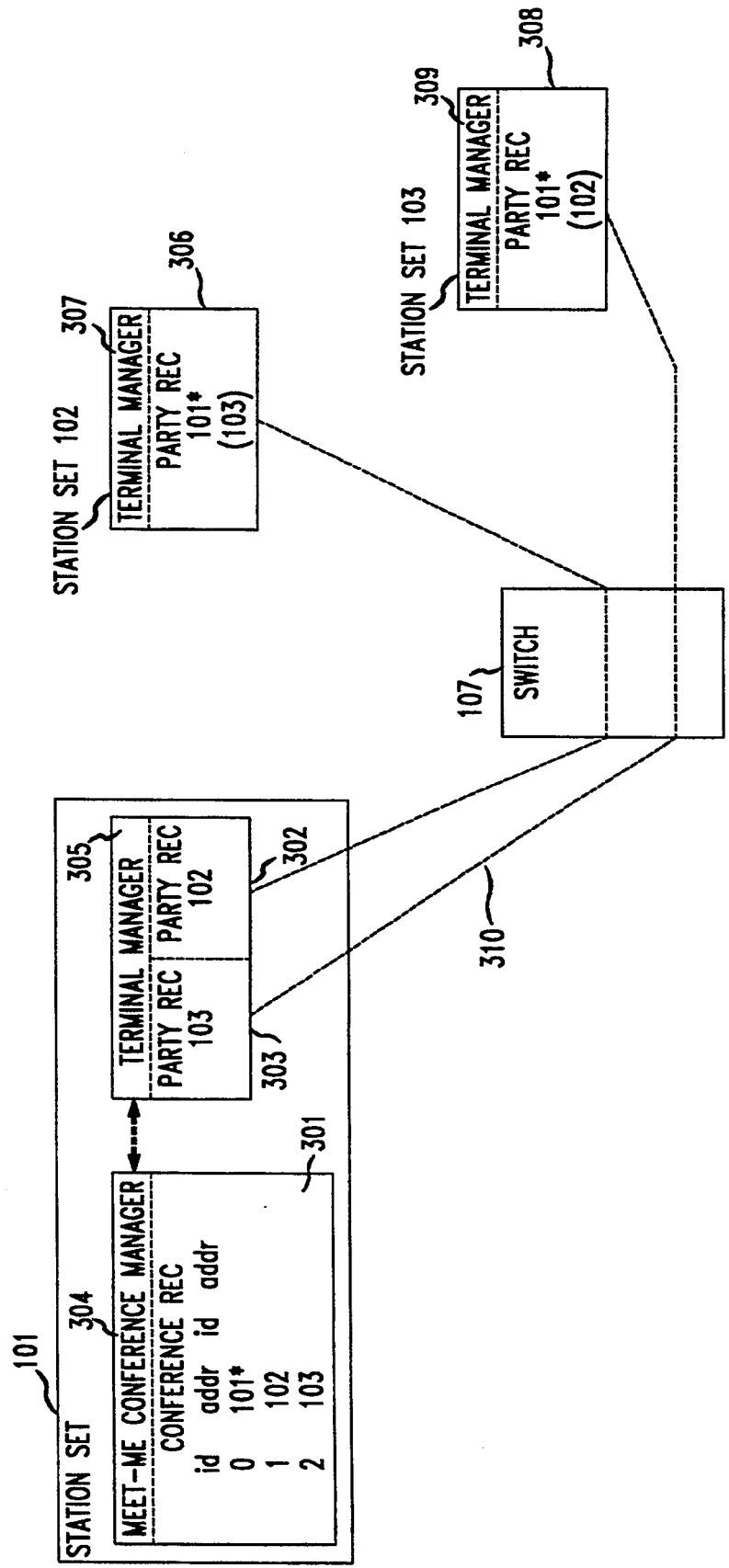
FIG. 3 illustrates the records which are maintained for a meet-me-conference.

FIG. 3 illustrates the records which have been set up in station sets 101 through 103 in response to the messages of FIG. 2. The records and managers are located at the highest software layer, the application layer, of the software structure of the station sets. As is described in greater detail later, the terminal manager application invokes the meet-me-conference manager application upon actuation of the meet-me-conference button on station set 101. Each terminal manager application maintains a party record for each half of the call in which the terminal manager application is involved. Each party record contains a record of the names of users and addresses (telephone numbers) of the parties on the other half of the call. For example, party records 302 and 303 contain the name and address of the users of station set 102 and station set 103, respectively. The name and address for station set 102 stored in party record 308 is designated by "102". Station sets 102 and 103 reflect in their party records (306 and 308) the station set that is the controlling station set and the sub-party station set. In party record 306, the name and address (101) for station set 101 has an asterisk after it denoting that this is the controlling party, and the name and address (103) for station set 103 is enclosed in parenthesis indicating that it is a sub-party in the meet-me-conference.

FIG. 3 only illustrates the logical message channels (such as logical channel 310) that are established between the station sets via switches. These logical channels allow the communication of messages between terminal managers. The manner in which these logical channels are established is set forth in the above-incorporated patent application. In addition, the switches are responsive to connect messages to establish voice channels between station sets. The manner in which voice channels are established and terminated is also set forth in the above-incorporated patent application.

Within station set 101, meet-me-conference manager application 304 maintains conference record 301 which maintains the ID numbers utilized to identify the different users on the meet-me-conference call as well as the station set associated with that user. Terminal manager application 305 is responsive to messages related to a meet-me-conference to relay those messages to meet-me-conference manager application 304. These identification numbers were included in the notify messages of FIG. 2. In addition, meet-me-conference manager application 304 can directly access party records 302 and 303, and terminal manager application 305 can directly access conference record 301. In party record 306 of station set 102, station set 101 (entry 101*) is designated as controlling the meet-me-conference and station set 103 (entry 103) is designated as being a sub-party.

Station set 102 builds party record 306 in response to the set-up message in line 201 of FIG. 2. Since station set 102 sent the set-up message to station set 101, station set 102 assumes that station set 101 is the master station set if a subsequent conference call is set up. The entry of "(103)" into party record 306 occurs when station set 102 receives the notification messages illustrated in lines 210, 213 and 216 of FIG. 2. These three notification messages inform station set 102 that station set 103 is the second party on the meet-me-conference call and give the name and address for station set 103. Party record 308 in station set 103 is built in a similar manner as party record 306.

Figure 4:
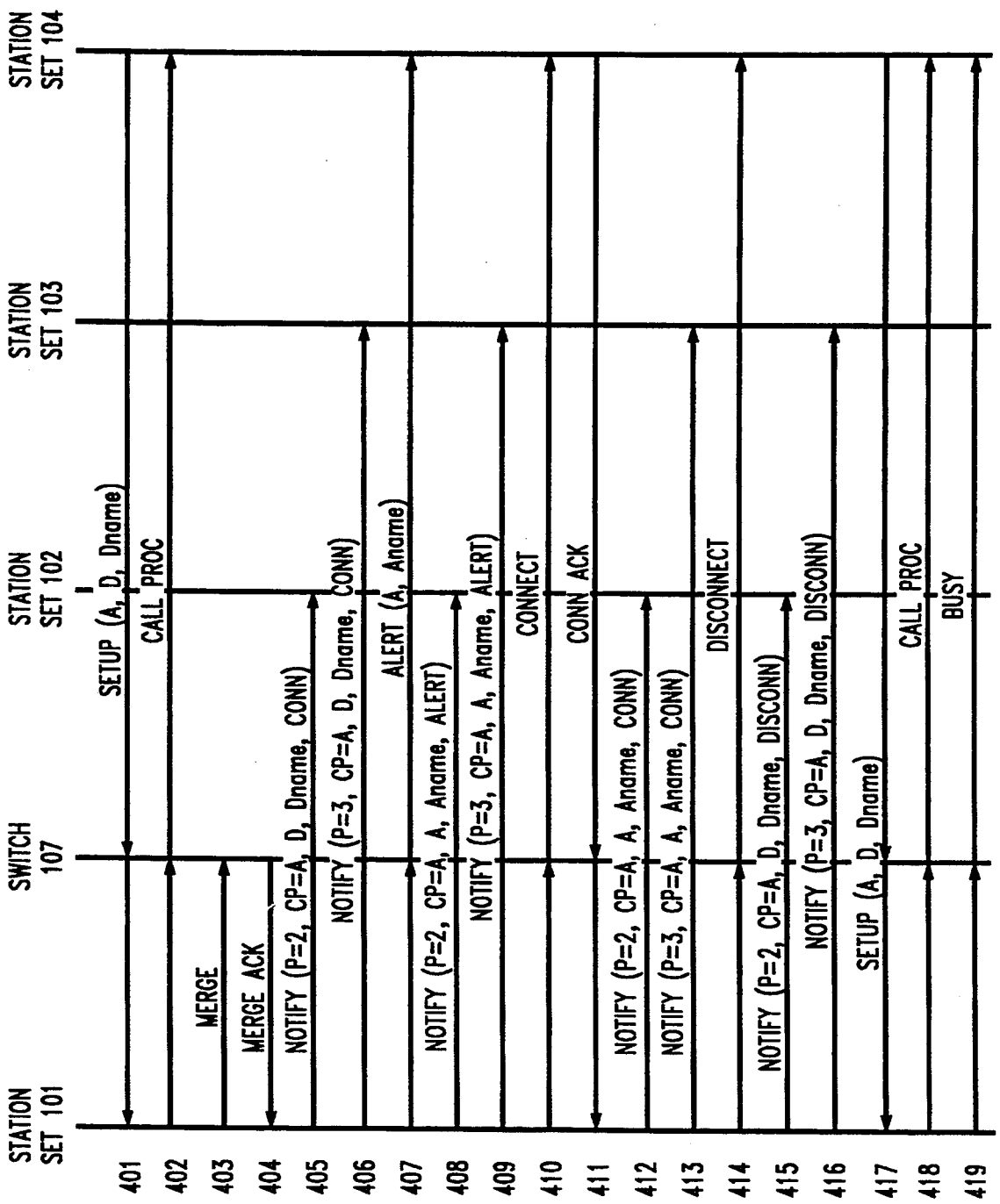
FIG. 4 illustrates the message flow for rejecting a fourth station set from being added to the meet-me-conference.

FIG. 4 illustrates the message flow for a continuation of the previous example in which station set 104 calls the number of the line appearance and is automatically placed in the meet-me-conference. However, the user of station set 101 does not want the user of station set 104 to be part of the meet-me-conference and actuates the disconnect button that disconnects station set 104 from the meet-me-conference. As each station set joins the meet-me-conference the name of the user of the new station set is automatically displayed to the user of station set 101 who can then disconnect the new station set by actuating the disconnect button.

Station set 104 transmits the setup message illustrated in line 401 of FIG. 4 to establish a call between station set 101 and station set 104. Station set 101 responds with the call proceeding message of line 402 and the merge message of line 403. Switch 107 is responsive to the merge message to transmit the merge acknowledge message in line 404. Station set 101 informs station sets 102 and 103 that station set 104 is being connected into the meet-me-conference by transmission of the notify messages of lines 405 and 406.

Station set 101 then transmits the alerting message of line 407 to station set 104. In addition, station set 101 notifies station sets 102 and 103 that station set 101 is being alerted. Next, station set 101 transmits the connect message to switch 107 and station set 104, and receives the connect acknowledgment message back from switch 107 by the connect acknowledge message of line 411. Station set 104 is now part of the meet-me-conference, and station set 101 transmits the notify messages of lines 412 and 413 to station sets 102 and 103, respectively, to inform these station sets of this fact.

The example assumes that once the name of the user of station set 104 is displayed to the user of station set 101, the user of station set 101 actuates the disconnect button to terminate station set 104 from the conference. Actuation of the disconnect button causes the disconnect message of line 414 to be transmitted to station set 104 and switch 107. The transmission of the disconnect message causes switch 107 to disconnect station set 104 from the meet-me-conference. In addition, station set 101 transmits the notify messages of lines 415 and 416 to station sets 102 and 103, respectively, to inform those station sets that station 104 is no longer part of the meet-me-conference.

As each party is added or disconnected from the meet-me-conference, station sets 102 and 103 display the name of that party on their respective displays. The displaying of this information on station sets 102 and 103 is in response to the notify messages of lines 405, 406, 408, 409, 412, 413, 415, and 416. Station sets 102 and 103 utilize this information to update tables 306 and 308, respectively.

Once the user of station set 101 has actuated the meet-me-conference button for the second time, station set 101 does not automatically add any more calls into the meet-me-conference which is also referred to as deactivation of the meet-me-conference. The message flow for this operation is illustrated in lines 417, 418 and 419 of FIG. 4. In response to the setup message of line 417, station set 101 transmits back the call proceeding and busy messages of lines 418 and 419. The transmission of the busy message back to station set 104 assumes that there are no idle line appearances on station set 101. If station set 101 has a second line appearance which is idle, the call from station set 104 is directed to the second line appearance and is processed in the normal manner. The user of station set 101 can place the conference on hold, select the second line appearance, and talk to the user of station set 104. The users of station sets 101, 102, and 103 are never aware that station set 104 attempted to join the meet-me-conference.

After the deactivation of the meet-me-conference, any user of station set 101, 102, or 103 can add station set 104 into the conference by placing the meet-me-conference on hold, placing a separate call to station set 104, and joining station set 104 into the meet-me-conference using the standard conference feature.

Figure 5:
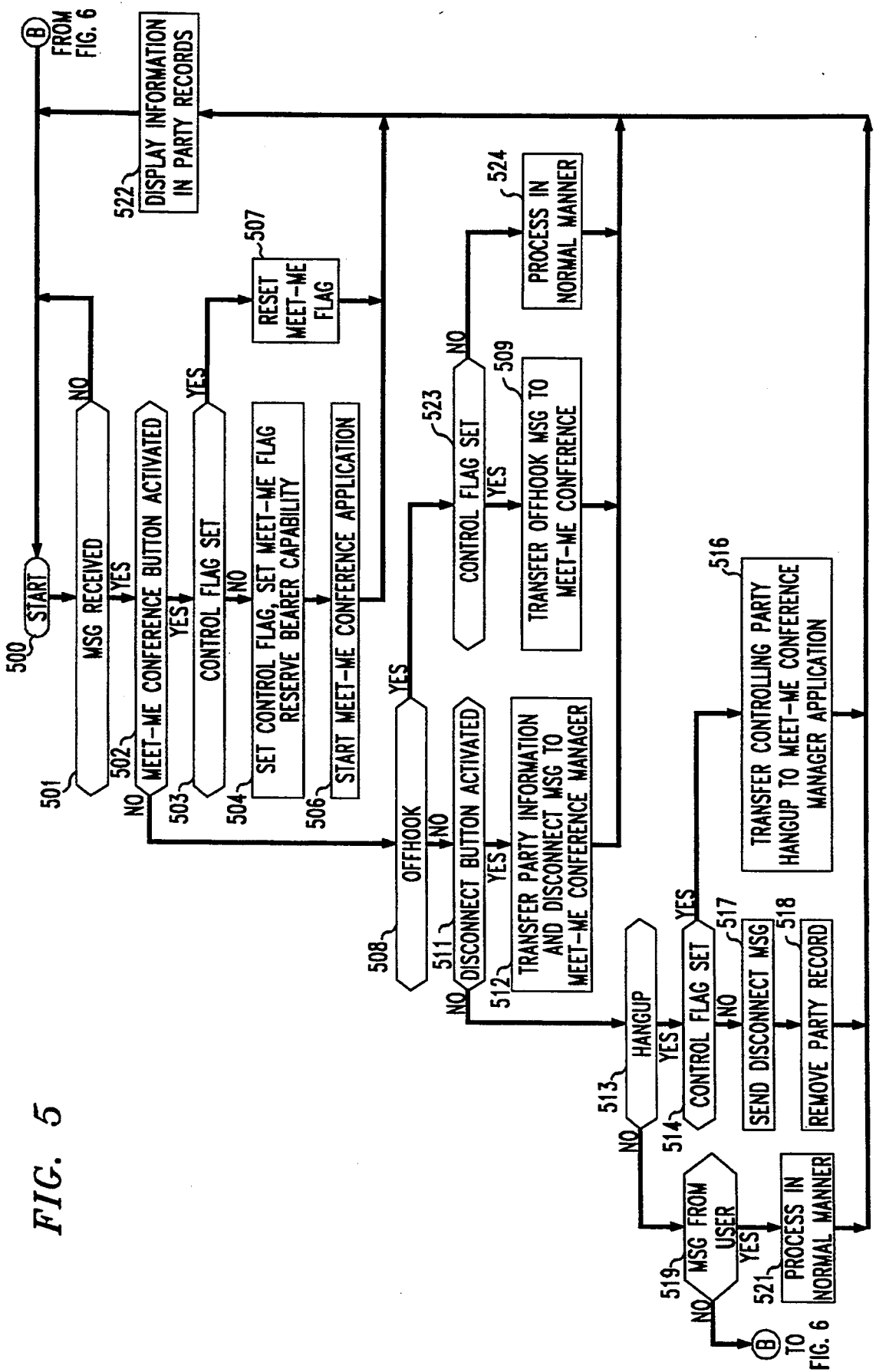
FIGS. 5 and 6 illustrate, in flow chart form, the operations performed by a terminal manager application in providing an unattended meet-me-conference call.
Figure 6:
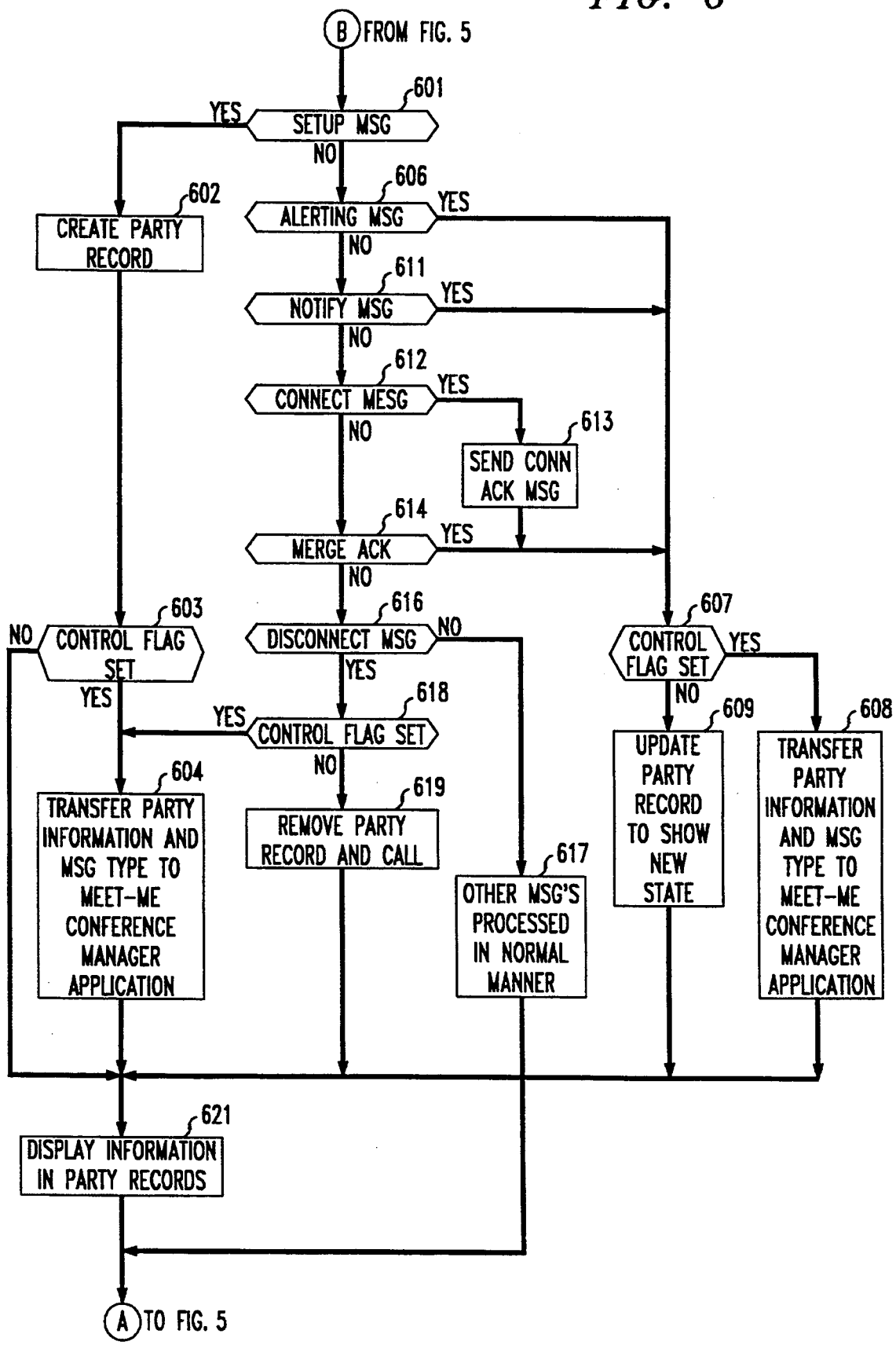

FIGS. 5 and 6 illustrate, in flow chart form, the functions performed by terminal manager application 305 of station set 101 as illustrated in FIG. 3. These functions are also illustrated in message format on FIGS. 2 and 4. As previously described, certain of the functions illustrated in FIGS. 2 and 4 are performed by meet-me-conference manager application 304. The operations of terminal manager application 305 as illustrated in FIGS. 5 and 6 send those functions to conference manager application 304. FIGS. 7 through 11 illustrate, in flow chart form, those functions performed by conference manager application 304. In FIGS. 5 and 6, the control flag and the meet-me flag are used to control the meet-me-conference. When the control flag is set on a station set, this indicates that the station set is responsible for controlling the setting up of the meet-me-conference. In the following paragraphs, the controlling station set is station set 101. When the meet-me flag is set, this indicates that other station sets can join the meet-me-conference by calling the designated line appearance; however, when the meet-me flag is reset, this indicates that no more station sets can be added to the meet-me-conference. The terminal manager application on a non-controlling station set (e.g. station set 102 of the present example) doesn't know if the call is a meet-me-conference call or a standard conference call.

In FIG. 5, blocks 500 and 501 wait for a message to be received from another station set, a switch, or an internal message caused by the actuation of a button on the station set. When a message is received, control is transferred from decision block 501 to decision block 502. The latter decision block determines if the meet-me-conference button has been activated. If that button has been activated, control is transferred to decision block 503, which checks if the control flag is set. If the control flag is not set, control is transferred to block 504 which sets both the control and meet-me flags and reserves bearer capability for the meet-me-conference call. After receiving control from block 504, block 506 then starts the execution of meet-me-conference manager application 304. Returning to decision block 503, if the control flag is set which indicates that this is the second actuation of the meet-me-conference button, control is transferred to block 507. Block 507 resets the meet-me flag resulting in all new incoming calls be excluded from the meet-me-conference. After execution of either block 506 or 507, control is transferred to block 522 which displays the information in the party records. (Note, if the station set executing the terminal manager application is not the controlling station set, e.g. station sets 102, 103, and 104, there is only one party record to be displayed.)

Returning to decision block 502, if the result of this decision is no, control is transferred to decision block 508 which checks if the user of the station set has gone off hook. Recall that station set 101 does not have to be off hook on the line appearance that is being used to establish the meet-me-conference while the other station sets are calling that line appearance to be added into the meet-me-conference. If user of station set 101 does place a call to another station set (for example station set 104) using the line appearance on which the meet-me-conference capability has been established, as station sets 102 and 103 call that line appearance, station sets 102 and 103 are automatically added to the existing call between station sets 101 and 104. However, station set 101 does reserve signaling and bearer capability for when the user does go off hook. If the station set has gone off hook, control is transferred from decision block 508 to decision block 523. If the control flag is not set, decision block 523 transfers control to block 524 which processes the off hook in a normal manner before transferring control to block 522. If the control flag is set, control is transferred to block 509 which in turn invokes meet-me-conference manager application 304. The functions of block 509 with respect to meet-me-conference manager application 304 are given in greater detail in FIG. 7. These functions join the controlling station into the meet-me-conference and transmit notify messages to the other station sets on the meet-me-conference call informing them that the controlling station set is now present on the meet-me-conference call.

Figure 8:
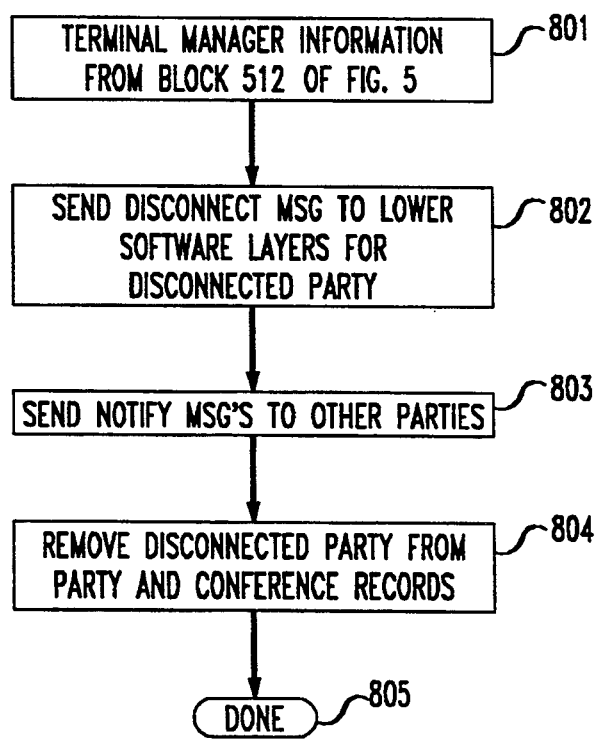

Returning now to decision block 508, if the result of this decision block is no, decision block 511 is executed to determine if the disconnect button has been activated on the station set. If the disconnect button has been activated, block 512 is executed. The functions performed by the meet-me-conference manager application in response to the execution of block 512 are illustrated in FIG. 8. These functions consist of terminating a designated station set from the meet-me-conference call and transmitting notify messages to the remaining station sets informing them that the designated station set has been disconnected.

Returning to decision block 511, if the result is no, control is transferred to decision block 513. The latter decision block determines whether the user of the station set wishes to disconnect from the call. If the answer is yes, control is transferred to decision block 514 which checks to see if the control flag is set indicating that the station set is the controlling station set (station set 101). If the control flag is set, control is transferred to block 516. Block 516 invokes meet-me-conference manager application 304 to perform the functions illustrated in FIG. 9. These functions disconnect all parties from the meet-me-conference and remove party records 302 and 303 and meet-me-conference record 301 as illustrated for station set 101 in FIG. 3. After these functions have been performed by meet-me-conference manager application 304, control is transferred to block 522 of FIG. 5.

Returning to decision block 514, if the control flag is not set, indicating that the station set is not station set 101 of the present example, control is transferred to block 517 which transmits a disconnect message disconnecting the station set from the meet-me-conference call and transfers control to block 518 which removes the party record associated with the meet-me-conference call. From block 518, control is transferred to block 522.

Returning to decision block 513, if the result of the decision is no, control is transferred to decision block 519. If it is a message from the user, control is transferred to block 521 which processes this message in a normal manner. If the result of decision block 519 is no, control is transferred to decision block 601 of FIG. 6.

In FIG. 6, if a setup message was received, control is transferred from decision block 601 to block 602 which creates a party record. Next, decision block 603 is executed to determine if the control flag is set, indicating that station set 101 of the present example is executing the terminal manager application. If the control flag is set, block 604 is executed which results in meet-me-conference manager application 304 performing the functions as detailed in FIG. 10. Then control is transferred to block 621 which displays the information in the party records. If the control flag is not set, control is immediately transferred to block 621 from decision block 603. Note that the transmission of the call proceeding messages of FIGS. 2 and 4 is performed in a lower software layer.

Returning to decision block 601, if the result of this decision block is no, control is transferred to decision block 606. If the message is an alerting message, decision block 606 transfers control to decision block 607 which determines if the control flag is set. If the control flag is not set, control is transferred to block 609 which updates the party record to show the new state as the alerting state. Block 609 then transfers control to block 621. Returning to decision block 607, if the control flag is set, control is transferred to block 608, which results in meet-me-conference manager application 304 performing the functions illustrated in FIG. 11 before transferring control to block 621.

Returning to decision block 606, if the result of this decision block is no, control is transferred to decision block 611, which checks if the message is a notify message. If the message is a notify message, control is transferred to decision block 607, whose functions have already been described.

If the result of decision block 611 is no, control is transferred to decision block 612, which checks if the message is a connect message. If the answer is yes, block 613 is executed, which first sends a connect acknowledgement message back to the station set originating the connect message and then transfers control to decision block 607, whose functions have already been described. If the result of decision block 612 is no, control is transferred to decision block 614, which checks if a merge acknowledge message was received. If the answer is yes, control is transferred to decision block 607, whose functions have been previously described.

If the result obtained by decision block 614 is no, control is transferred to decision block 616, which checks to see if a disconnect message was received. If the answer is no, control is transferred to block 617, which processes all other messages in a normal manner before transferring control to block 500 of FIG. 5 via connector A. If a disconnect message was received, decision block 616 transfers control to decision block 618. If the control flag is set, decision block 618 transfers control to block 604, whose functions had been previously described. If the control flag is not set, control is transferred to block 619, which removes the party record before transferring control to block 621.

Figure 7:
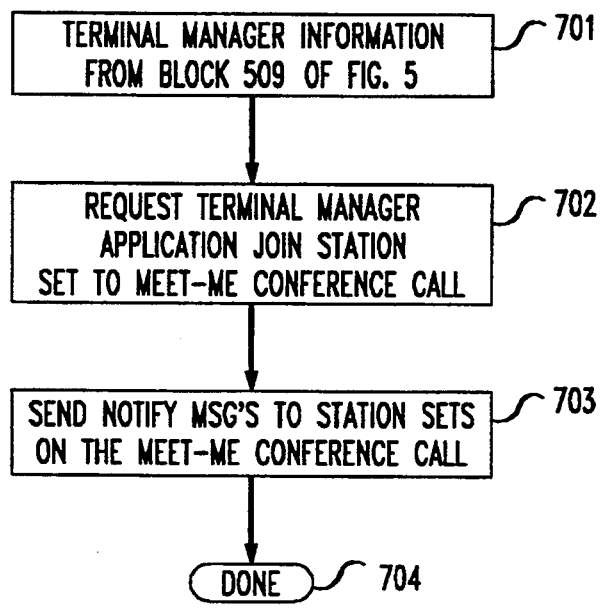

The following is a discussion of the functions performed by meet-me-conference manager application 304 of FIG. 3 as illustrated in FIGS. 7 through 11. FIG. 7 is executed in the present examples when it is determined that the user of station set 101 has gone off hook. Block 702 requests that terminal manager application 305 join the station set into the meet-me-conference call. Recall that the signaling and bearer capabilities had already been reserved for station set 101 to enter the meet-me-conference call by block 504 of FIG. 5. Next, block 703 causes notify messages to be sent to the other station sets on the meet-me-conference call, advising them of the fact that the station set 101 is now part of the meet-me-conference call. Finally, block 704 returns control to terminal manager application 305.

Figure 12:
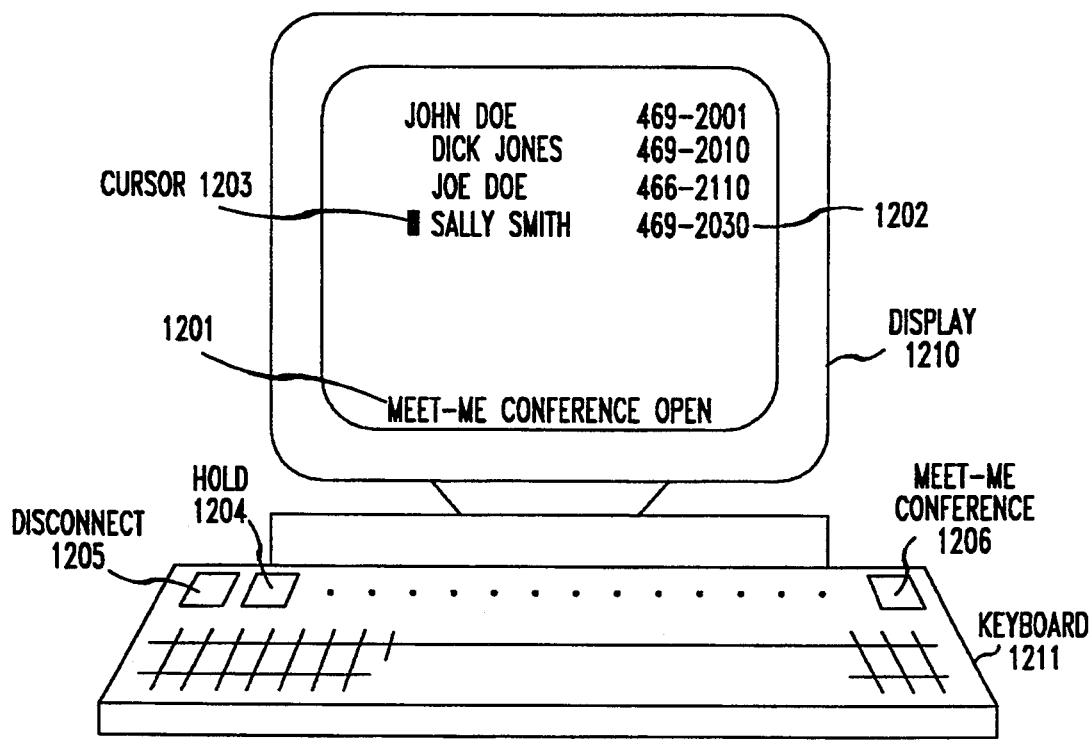
FIGS. 12 and 13 illustrate a station set in pictorial form.

FIG. 8 illustrates the functions performed by meet-me-conference manager application 304 in response to terminal manager application 305 detecting that the disconnect button had been activated. The disconnect button is associated with a particular station set presently on the meet-me-conference call. In the present example, this association is performed by the user of station set 101 positioning the cursor next to that user's name as illustrated in FIG. 12 before the disconnect button is activated. Block 802 disconnects that associated station set by transmission of a disconnect message to the lower software layers. Block 803 sends notify messages to the other parties advising them of the fact that the associated station set has been disconnected. Block 804 removes reference to the associated station set from conference record 304 and from the appropriate party record. Finally, block 805 returns control to terminal manager application 305.

FIG. 9 illustrates the operations performed by meet-me-conference manager application 304 in response to terminal manager 305 detecting that station set 101 has hung up. Block 902 sends disconnect messages to all parties on the meet-me-conference call, and block 903 removes all party and conference records from station set 101 associated with the meet-me-conference call. Finally, block 904 returns control to terminal manager application 305.

FIG. 10 illustrates the functions performed by meet-me-conference manager application 304 when terminal manager application 305 has detected the receipt of either a setup message or a disconnect message. Decision block 1002 determines whether a setup message has been received and transfers control to decision block 1003 if a setup message was received. Decision block 1003 checks the state of the meet-me flag. If the meet-me flag has been reset, this indicates that no more calls are allowed to join the meet-me-conference call, and the call is processed in a normal manner with respect to another line appearance. If the meet-me flag is set, then the station set transmitting the setup message is allowed to join the meet-me-conference call. If the flag has been reset, block 1004 transmits a busy message to the station set that had transmitted the setup message, unless there is an idle line appearance. If there is an idle line appearance, the call is transferred to that line appearance and is processed in the normal manner. If the meet-me flag is set, control is transferred to decision block 1006. This decision block determines whether the station set is the first party on the call or not. If it is the first party, block 1007 is executed to send a connect message back to the station set. However, if the station set is not the first party, block 1008 sends a merge message to switch 107. Block 1009 transmits notify messages to the other parties on the meet-me-conference call and an alerting message back to the station set originating the setup message. Next, block 1007 is executed. Finally, block 1011 is executed to add the station set originating the setup message to meet-me-conference record 301.

Returning to decision block 1002, if the message is not a setup message, then it must be a disconnect message, and block 1012 is executed which transmits notify messages to the remaining station sets on the meet-me-conference call to inform them that the transmitting station set has dropped off of the call. Block 1013 removes the station set from the appropriate party record and block 1014 removes the references to the party from meet-me-conference record 301. Decision block 1017 determines if the last party has been removed from record 301. If the last party has been removed, blocks 1018, 1019, and 1020 reset the control flag, deactivate the conference manager application and remove the conference record, respectively.

Figure 11:
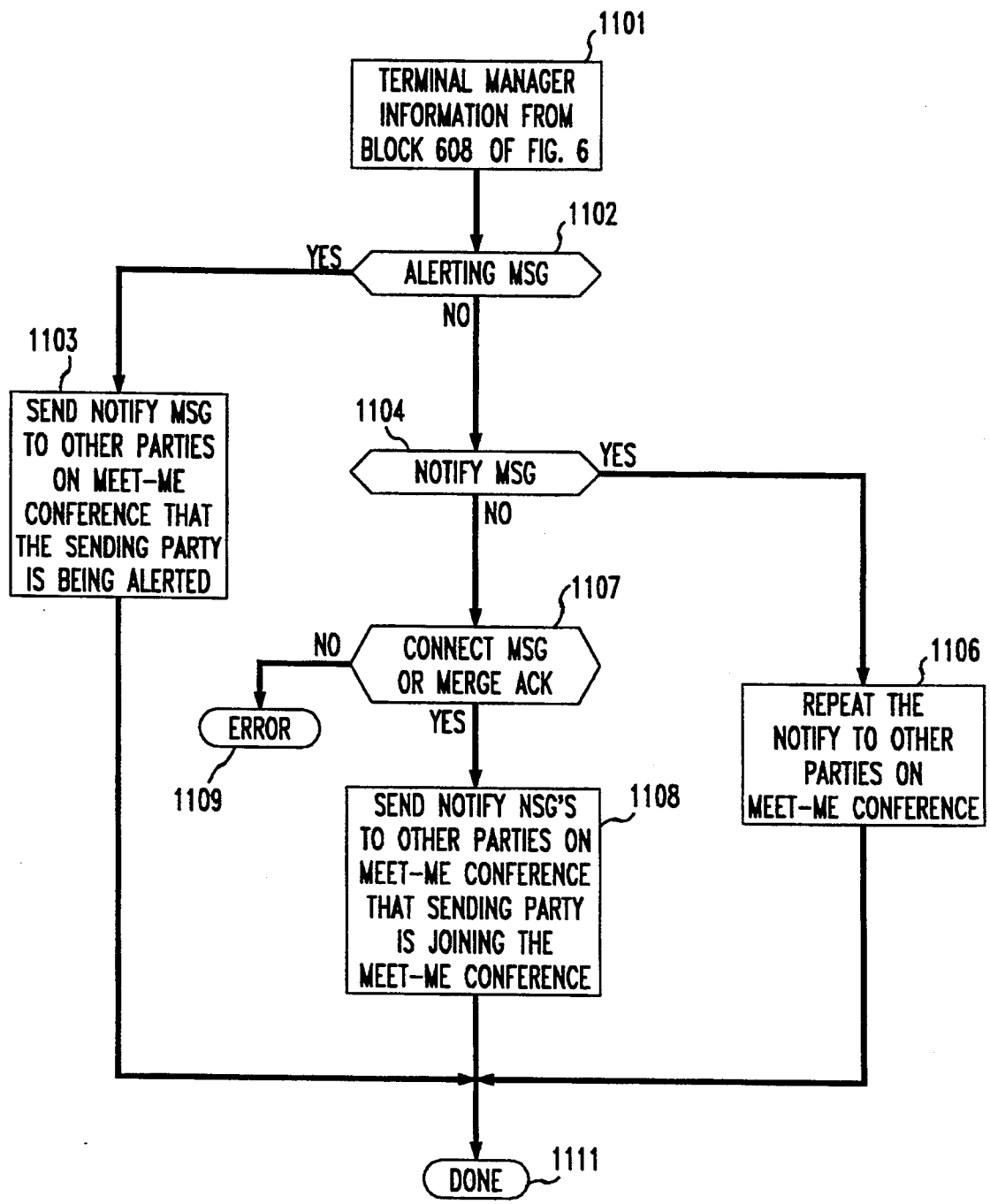

FIG. 11 illustrates the functions performed by meet-me-conference manager application 304 when terminal manager application 305 has detected an alerting message, notify message, connect message, or merge acknowledge message. If an alerting message has been detected, decision block 1102 transfers control to block 1103. Block 1103 transmits notify messages to the other parties on the meet-me-conference call informing them that the party sending the alerting message is being alerted. If a notify message was detected, decision block 1104 transfers control to block 1106, which simply repeats the notify message to the other parties on the meet-me-conference call. If either a connect or merge acknowledge message was detected, block 1108 sends notify messages to the other parties on the meet-me-conference call, informing them that the sending party is joining the meet-me-conference call. Finally, block 1111 transfers control back to terminal manager application 305.

Figure 13:
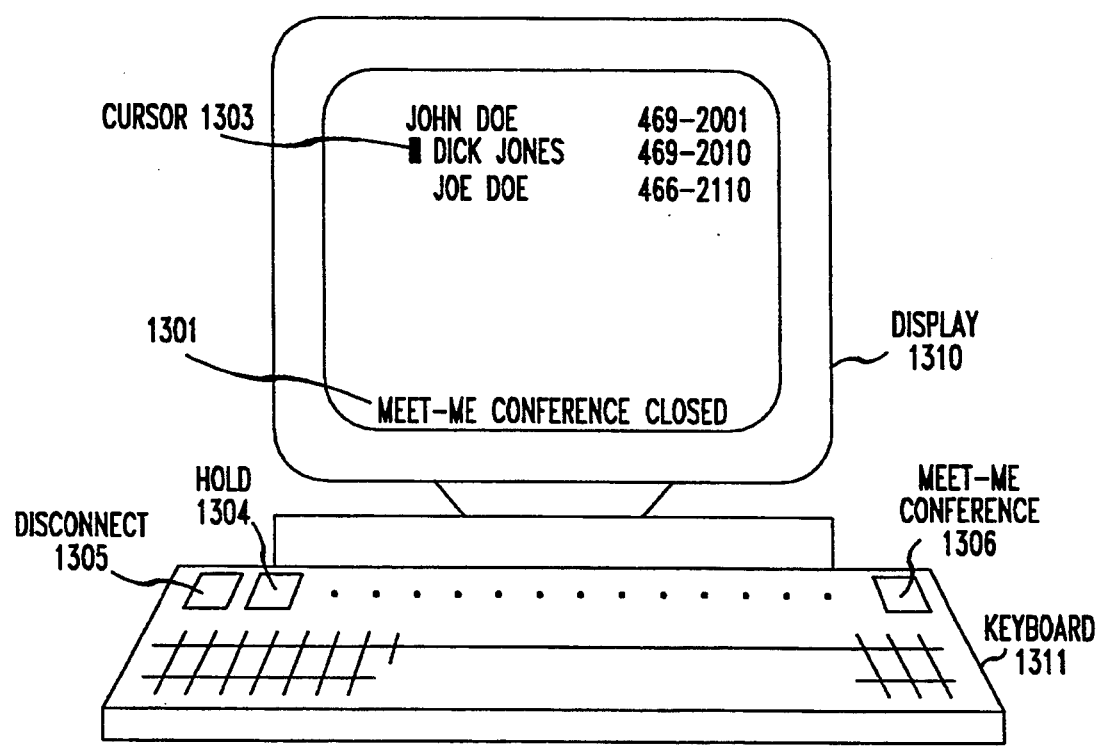

FIGS. 12 and 13 show a pictorial representation of station set 101 to demonstrate how the disconnect and meet-me-conference buttons function. FIG. 12 illustrates the situation where the meet-me-conference is still open for stations to join. Station set 104, whose user is Sally Smith, has called the designated line appearance and joined the meet-me-conference call. The user of station set 101 does not want Ms. Smith on the meet-me-conference call and positions cursor 1203 next to her name and actuates disconnect button 1205. FIG. 13 illustrates that Ms. Smith has been removed from the meet-me-conference call. Now, the user, in order to close the meet-me-conference call to all other parties, actuates the meet-me-conference button 1306 which closes the conference call to all other parties. As illustrated in FIG. 13, message 1301 displays the fact that the meet-me-conference call is closed.

It is to be understood that the above-described embodiments are merely illustrative of principles of the invention and that other arrangements may be devised by those skilled in the art without departing from the spirit or scope of the invention. Whereas the present embodiment has been described with respect to voice telecommunication calls, one skilled in the art could ready apply the principles of the present invention to other types of telecommunication calls such as video telecommunication calls.

We claim:

1. A method for implementing an automatic meet-me-conference on a telecommunication switching system, comprising the steps of:

starting the execution of a software application program in a first telecommunication terminal;

receiving, by the software application program, a first call directed to the first telecommunication terminal from a second telecommunication terminal;

receiving, by the software application program, a second call directed to the first telecommunication terminal from a third telecommunication terminal; and joining the first and second calls into the meet-me-conference call by the software application program.

2. The method of claim 1 further comprises the step of joining, by the software application program, the first telecommunication terminal into the meet-me-conference call in response to a call origination generated on the first telecommunication terminal.

3. The method of claim 2 further comprises the step of blocking other telecommunication terminals from entering the meet-me-conference in response to an action of a user of the first telecommunication terminal requesting deactivation of the meet-me-conference.

4. The method of claim 3 further comprises the step of placing the meet-me-conference on hold by an action of the user of the first communication terminal;

calling a fourth communication terminal by an action of the user of the first telecommunication terminal; and conferencing the fourth telecommunication terminal into the meet-me-conference by an action of the user of the first telecommunication terminal.

5. The method of claim 2 further comprises the step of notifying, by the software application program, the second telecommunication terminal of the names and telephone numbers of the users of the first and third telecommunication terminals when each telecommunication terminal joins the meet-me-conference and when the first or third telecommunication terminals changes call state.

6. The method of claim 5 further comprises the step of disconnecting, by the software application program, the second or third telecommunication terminal from the meet-me-conference in response to a user action on the first telecommunication terminal.

7. A method for implementing an automatic meet-me-conference on a telecommunication switching system, comprising the steps of:

activating the meet-me-conference;

receiving, by a first telecommunication terminal, a first call directed to the first telecommunication terminal from a second telecommunication terminal;

receiving, by the first telecommunication terminal, a second call directed to the first telecommunication terminal from a third telecommunication terminal; and joining the first and second calls into the meet-me-conference call by the first telecommunication terminal.

8. The method of claim 7 further comprises the step of blocking other telecommunication terminals from entering the meet-me-conference in response to an action of the user of the first telecommunication terminal requesting reactivation of the meet-me-conference.

9. The method of claim 8 further comprises the step of joining the first telecommunication terminal into the meet-me-conference call in response to a call origination generated on the first telecommunication terminal.

10. The method of claim 9 further comprises the step of notifying, by the first telecommunication terminal, the second telecommunication terminal of the names and telephone numbers of users of the first and third telecommunication terminals when each telecommunication terminal joins the meet-me-conference and when the first or third telecommunication terminals changes call state.

11. The method of claim 10 further comprises the step of disconnecting, by the first telecommunication terminal, the second or third telecommunication terminal from the meet-me-conference in response to a user action on the first telecommunication terminal indicating disconnect.

12. An apparatus for implementing an automatic meet-me-conference on a telecommunication switching system, comprising:

means for starting the execution of a software application program in a first telecommunication terminal;

means, in the software application program, for receiving a first call directed to the first telecommunication terminal from a second telecommunication terminal;

means, in the software application program, for receiving a second call directed to the first telecommunication terminal from a third telecommunication terminal; and means, in the software application program, for joining the first and second calls into the meet-me-conference call.

13. The apparatus of claim 12 further comprises means, in the software application program, for joining the first telecommunication terminal into the meet-me-conference call in response to a call origination generated on the first telecommunication terminal.

14. The apparatus of claim 13 further comprises means for blocking other telecommunication terminals from entering the meet-me-conference in response to an action of a user of the first telecommunication terminal requesting deactivation of the meet-me-conference.

15. The apparatus of claim 13 further comprises means, in the software application program, for notifying the second telecommunication terminal of the names and telephone numbers of users of the first and third telecommunication terminals when each telecommunication terminal joins the meet-me-conference and when the first or third telecommunication terminals changes call state.

16. The apparatus of claim 15 further comprises means, in the software application program, for disconnecting the second or third telecommunication terminal from the meet-me-conference in response to a user action on the first telecommunication terminal indicating disconnect.

17. An apparatus for implementing a meet-me-conference on a telecommunication switching system, comprising:

means, in a first telecommunication terminal, for activating the meet-me-conference;

means, in a first telecommunication terminal, for receiving a first call directed to the first telecommunication terminal from a second telecommunication terminal;

means, in the first telecommunication terminal, for receiving a second call directed to the first telecommunication terminal from a third telecommunication terminal; and means, in the first telecommunication terminal, for joining the first and second calls into the meet-me-conference call.

18. The apparatus of claim 17 further comprises means for blocking other telecommunication terminals from entering the meet-me-conference in response to an action of the user of the first telecommunication terminal requesting deactivation of the meet-me-conference.

19. The apparatus of claim 18 further comprises means, in the first telecommunication terminal, for joining the first telecommunication terminal into the meet-me-conference call in response to a call origination generated on the first telecommunication terminal.

20. The apparatus of claim 19 further comprises means, in the first telecommunication terminal, for notifying the second telecommunication terminal of the name and telephone numbers of the users of the first and third telecommunication terminals when each telecommunication terminal joins the meet-me-conference and when the first or third telecommunication terminals changes call state.

21. The apparatus of claim 20 further comprises means, in the first telecommunication terminal, for disconnecting the second or third telecommunication terminal from the meet-me-conference in response to a user action on the first telecommunication terminal indicating disconnect.

* * * * *